United States Patent
Brow et al.

Patent Number: 5,368,803
Date of Patent: Nov. 29, 1994

[54] METHOD OF MAKING RESIN IMPREGNATED FIBROUS PANELS

[75] Inventors: Mark J. Brow, Allen Park; Ronald P. Pitsch, Farmington Hills, both of Mich.

[73] Assignee: United Technologies Automotive, Inc., Dearborn, Mich.

[21] Appl. No.: 17,216

[22] Filed: Feb. 12, 1993

[51] Int. Cl.$^5$ .................... B29C 67/14; C08K 7/14; C08G 14/10
[52] U.S. Cl. ................ 264/257; 264/331.22; 524/596; 528/163; 528/164
[58] Field of Search ............. 264/257, 319, 331.22, 264/236, 347; 524/596; 528/163, 164

[56] References Cited

U.S. PATENT DOCUMENTS

| | | | |
|---|---|---|---|
| 2,873,813 | 2/1959 | Haerther, Jr. et al. | 264/331.22 |
| 3,907,724 | 9/1975 | Higginbottom | 524/25 |
| 3,953,632 | 4/1976 | Robinson | 428/95 |
| 4,647,324 | 3/1987 | Mtangi et al. | 156/62.2 |
| 4,757,108 | 7/1988 | Walisser | 524/596 |
| 4,785,073 | 11/1988 | Farkas et al. | 264/331.22 |
| 4,904,516 | 2/1990 | Creamer | 528/163 |
| 4,960,826 | 10/1990 | Waliser | 524/494 |
| 5,154,968 | 10/1992 | DePetris et al. | 428/283 |
| 5,296,584 | 3/1994 | Walisser | 524/596 |

Primary Examiner—Jay H. Woo
Assistant Examiner—Robert B. Davis
Attorney, Agent, or Firm—William W. Habelt

[57] ABSTRACT

A fibrous resinated panel is provided which when used in a closed environment releases relatively minor amounts of trimethylamines, aldehydes and phenolic compounds into the closed environment. The panel is formed by compressing a fibrous mat impregnated with a thermosetting resin system in a mold cavity defined between an upper and a lower inner mold surface at a temperature between 400° to 600° for 45 to 90 seconds whereby the thermosetting resin is substantially cured and the mat is shaped to conform to a desired contour prior to removing the mat from the mold cavity. The thermosetting resin system used to impregnate the mat includes an essentially aqueous A-stage form resole-melamine composition containing residues of free melamine(s) to free aldehyde(s) to free phenolic compound(s) in a molar equivalent ratio ranging from about 0.2:1.5:1 to about 0.8:3.5:1.

1 Claim, 1 Drawing Sheet

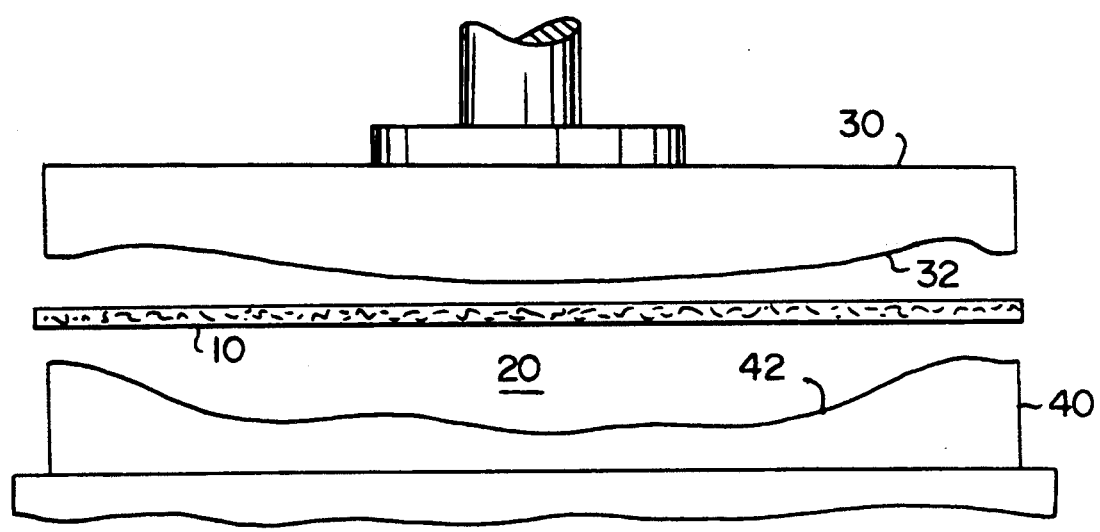

METHOD OF MAKING RESIN IMPREGNATED FIBROUS PANELS

TECHNICAL FIELD

The present invention relates generally to resin impregnated fibrous panels and a method of making same and, more particularly, to melamine based resin impregnated fibrous panels and a method of making such panels whereby the panels exhibit a low odor and low post-molded gas releases of formaldehyde, phenols and trimethylamines.

BACKGROUND ART

Molded panels of mineral-wool, fiberglass wool or plastic fibers heat cured in a thermosetting resin are well known in the art to be suitable for use as automobile headliners, door panels, and other automobile interior structures, as well as other structural panel applications in buildings, mobile homes, boats and the like. One common method of manufacturing such panels is to first contact a fibrous material with a water soluble thermosetting resin to form a resin impregnated mat. A panel of a desired contour may be readily formed from such a resin impregnated mat by placing the impregnated mat in a mold and subjecting the mat to temperature and pressure for a selected period of time sufficient to cure the resin and shape the mat into the desired panel contour.

Many thermosetting resin systems used in the prior art to wet mineral or glass fibers to form resin impregnated fibrous mats suitable for heat curing under pressure in a press or mold to provide a contoured panel have been urea formaldehyde, urea phenol formaldehyde, or urea phenolic based resins. When used in a closed environment, for example the interior of an automobile, panels produced from such urea based resin have been known to undesirably release an odor, as well as a residue containing phenols and formaldehyde, when exposed to high humidity and temperature conditions.

Melamine based resins have been suggested for use in resin impregnated fibrous mats for forming cured products. For example, a resin impregnated fibrous mat is disclosed in U.S. Pat. No. 3,953,632 wherein the mat is formed of randomly oriented plastic fibers that have been impregnated with a thermosetting resin and a thermoplastic copolymer. The thermosetting resin is selected from the group consisting of melamine-formaldehyde, hexamethoxymethyleneamine and urea-formaldehyde resins, and the thermoplastic copolymer is the product of the polymerization of a plurality of monomers at least one of which is a vinyl compound with an acid generating catalyst. After partially curing in a kiln or oven, the mat may be pressure shaped in a press or mold between opposing plates to produce a heat cured, pressed or mold sheet of a desired surface contour.

U.S. Pat. No. 4,960,826 discloses a binding adhesive useful in forming resin impregnated fibrous products, especially glass fiber containing products, such as pipe insulation, brake insulation, board products, and molded automotive products such as top liners and hood liners. The disclosed binding adhesive comprises an essentially aqueous res(ole)(ite)-melamine composition having an A-stage form containing residues of free melamine(s) to aldehydes(s) to phenolic compound(s) in a molar equivalent ratio ranging from about 0.2:1.5:1 to 0.8:3.5:1. The A-stage form of the res-melamine resin is said to be low temperature safe-storage stable and to be essentially infinitely soluble in water. It is further disclosed in U.S. Pat. No. 4,960,826, that a resinated glass fiber matrix may be readily formed by heat curing a resin impregnated glass wool at elevated temperatures. By application of heat to the resin impregnated glass wool in a press, mold or curing oven, the C-stage composition of the melamine-aldehyde-phenolic system is formed to provide a fiber reinforced resin product having outstanding resistance to punking or thermal attack and suitable hardness.

During the heat curing of melamine aldehyde composition, trimethylamines are formed as a reaction product. As trimethylamines carry a pungent fishy odor and may also be undesirable to breathe, it is desirable that panels formed using melamine based resins be manufactured in a manner that minimizes the release of aldehyde, phenolic and trimethylamine gases. Urea based resin panels which release significant levels of phenolic and/or aldehyde gases, or melamine based resins which release significant levels of phenolic, aldehyde and/or trimethylamine gases, may well be unsuitable for use in environments where people or animals will be exposed to such gas releases, for example closed environments such as home interior or vehicle occupant cabins.

SUMMARY OF THE INVENTION

It is an object of one aspect of the present invention to provide a fiber reinforced melamine based resin panel having no odor, and releasing very low levels of trimethylamines, aldehydes and phenolic compounds when exposed to high humidity and temperature.

It is an object of a further aspect of the present invention to provide a method of manufacturing a fiber reinforced, melamine based resin panel having no odor, and releasing very low levels of trimethylamines, aldehydes and phenolic compounds when exposed to high humidity and temperature.

The process of the present invention produces a fibrous resinated panel which when used in a closed environment, such as for example the interior of an automobile, releases relatively minor amounts of trimethylamines, aldehydes and phenolic compounds into the closed environment. A fibrous mat impregnated with a thermosetting resin system is compressed in a mold cavity defined between an upper and a lower inner mold surface, each of which surfaces are maintained at a temperature within a selected temperature range, for a selected period of time whereby the thermosetting resin is substantially cured and the mat is shaped to conform to a desired contour prior to removing the mat from the mold cavity. The process of the present invention is characterized in that the thermosetting resin system used to impregnate the mat comprises an essentially aqueous A-stage form resole-melamine composition containing residues of free melamine(s) to free aldehyde(s) to free phenolic compound(s) in a molar equivalent ratio ranging from about 0.2:1.5:1 to about 0.8:3.5:1, and in that the mat is compressed for a period of time ranging from about 45 seconds to about 90 seconds between upper and lower inner mold surfaces maintained at a temperature within a range extending from about 400° F. to about 600° F. The process may be further characterized in that the thermosetting resin system has a pH maintained at a level in the range of 4.0 to 6.0.

The fibrous resinated panel manufactured in accordance with the process of the present invention is characterized in that when exposed to high humidity (100%) and high temperature (120 F.) in a closed environment, such as for example a closed automobile occupant cabin, the amount of trimethylamine(s) and other amine(s) released into the closed environment is less than about 0.1 parts per million by volume, i.e. substantially non-detectable by conventional measuring techniques, the amount of phenolic compound(s) released into the closed environment is less than about 0.1 parts per million by volume, i.e. also substantially non-detectable, and the amount of formaldehyde(s) is less than about 1.5 parts per million by volume.

The fibrous resinated panel manufactured in accordance with the process of the present invention is further characterized in that when exposed to ambient conditions, i.e. humidity about (50%) and high temperature (80 F.) in a closed environment, such as for example a closed automobile occupant cabin, the amount of trimethylamine(s) and other amine(s) released into the closed environment is substantially non-detectable, the amount of phenolic compound(s) released into the closed environment is substantially non-detectable, and the amount of formaldehyde(s) is less than about 0.2 parts per million by volume.

BRIEF DESCRIPTION OF THE DRAWINGS

The present invention will be described herein with reference to the drawing wherein the sole figure is a sectional elevational view of an apparatus for forming a resin impregnated mat into a mold product.

DETAILED DESCRIPTION OF A PREFERRED EMBODIMENT

The fibrous resin panel manufactured by the process of the present invention is suitable for a wide variety of uses in closed environments occupied by humans and/or animals, including vehicle and structure interior, and is particularly suited for use in automobile interiors such as, for example, automobile headlines and trim panels. The fibrous resin panel will be discussed herein when used as a headliner in the interior of an automobile.

Referring now to the drawing, a resin impregnated, non-woven fibrous mat 10 is placed in a mold cavity 20 formed between two press plates 30 and 40 and subsequently compressed therein between the press plates. Depending on the intended use of the resultant molded panel, the inner surfaces 32 and 42, respectively, of the press plates 30 and 40 may be contoured to impart a desired contour to the resultant molded panel. The inner surfaces, i.e. the cavity facing surfaces, of the press plates are maintained at a temperature within a selected temperature range so that the resin impregnated fibrous mat 10 is exposed to a desired level of heating for a selected period of time during compression, after which the pressure is relieved and the molded panel removed from the mold cavity.

The fibrous material component of the resin impregnated non-woven mat 10 may comprise any suitable plastic, mineral, cellulose or glass fiber, and when the resultant panel is to be used as an automobile headliner or interior panel, may advantageously comprise a fiberglass wool of the type readily commercially available. The particular method used to form the resin impregnated mat per se is not germane to the present invention. The mat 10 may be formed, for example, by spraying the resin unto the fibrous material as it is deposited onto a traveling receiving surface, such as an endless belt, or by sprinkling or air-laying pre-wetted fibrous material onto an endless belt.

The process of the present invention and the panel produced thereby are characterized from the prior art in that the thermosetting resin system used to impregnate the fibrous material of the mat 10 comprises an essentially aqueous melamine-phenolic-aldehyde composition containing residues of free melamine(s) to free aldehyde(s) to free phenolic compound(s) in a molar equivalent ratio ranging from about 0.2:1.5:1 to 0.8:3.5:1; and in that the resin impregnated mat 10 is compressed between mold surfaces maintained at a temperature within the range extending from about 204° C. to about 316° C., for a period of time greater than about 45 seconds, and advantageously for a period of time ranging from at least about 45 seconds to less than about 90 seconds.

The very low residues of free melamine(s) to free aldehyde(s) to free phenolic compound(s) in the above-identified melamine-phenolic-aldehyde resin system render it particularly suitable for use in making molded panels in accordance with the process of the present invention in manufacturing fibrous resinated mold panels and other products having low odor and releasing relatively low amounts of trimethylamines, formaldehyde and phenolic compounds into the atmosphere when exposed to high humidity and temperature, that is humidity of about 100% and temperatures of about 50 degrees C. A detailed description of such a melamine-phenolic-aldehyde resin is provided in U.S. Pat. No. 4,960,826, to walisser, the entire disclosure thereof being herein incorporated by reference. A commercial resole melamine resin composition of the type disclosed in U.S. Pat. No. 4,960,826, is available from Borden, Inc. of Columbus, Ohio. In a resole melamine composition, there is sufficient formaldehyde and phenolic compounds for the composition to be thermosetting without the addition of a curing agent.

Applicants have found that in order to ensure that the release of undesirable gases containing trimethylamines, phenolic compounds and/or aldehydes from the resultant molded product produced from a glasswool fiber mat impregnated with the aforementioned aqueous melamine-phenolic-aldehyde resin system, the fibrous mat should be exposed during compression in the mold cavity to mold surfaces maintained at a temperature in the range from about 200 degrees C. to about 315 degrees C. for a period of time ranging from about 45 seconds to 90 seconds. Tests on a headliner produced using the aforementioned resin have shown that exposure during the compression process to temperatures in the aforementioned range for less than about 45 seconds results in a molded product which is prone when exposed to high humidity and temperature to release excessive amounts of formaldehyde and phenolic compounds from the headliner. Also, the tests showed that processing within the desired temperature range for longer than about 90 seconds did not further reduce the release of these gas from the resultant molded product.

Rather, compressing the melamine based resin impregnated mat 10 within the aforespecified temperature range for at least about 45 seconds and less than about 90 seconds, resulted in a molded product, such as an automotive headliner, which, when exposed to high humidity and temperature released very low levels of trimethylamines, phenols and formaldehyde. When the product of the present invention, in the form of a headliner installed in an automobile, was exposed in a soak chamber to a humidity of 100% and temperature of 120 degrees F. for a total time of four hours, the resultant levels in the closed environment of the automobile occupant cabin of formaldehyde were less than about 1.5 parts per million, of phenols ranged from non-detectable to 2 parts per billion, and trimethylamines were substantially non-detectable.

The process of the invention may be further characterized in that the thermosetting resin system has a pH maintained at a level in the range of 4.0 to 6.0. A lower pH, i.e. a more acidic pH, may render the molded product undesirably corrosive to metal when exposed to high humidity, and a higher pH, i.e less acidic pH, may adversely impact the curing process.

We claim:

1. An improved process of manufacturing a fibrous resinated panel comprising:

compressing a fibrous mat impregnated with a selected thermosetting resin system in a mold cavity defined between an upper and a lower inner mold surface, said mold surfaces maintained at a temperature within a selected temperature range, for a selected period of time, whereby said thermosetting resin is substantially cured and said mat is shaped to conform to a desired contour, and thereafter removing said mat from the mold cavity, the improvement comprising:

selecting as said thermosetting resin system an aqueous A-stage form resole-melamine composition containing residues of free melamine(s) to free aldehyde(s) to free phenolic compound(s) in a molar equivalent ratio ranging from about 0.2:1.5:1 to 0.8:3.5:1;

maintaining said mold surfaces temperature within a selected temperature range extending from about 204° C. to about 316° C. for a selected period of time ranging from at least about 45 seconds to less than 90 seconds; and maintaining said aqueous thermosetting resin at a pH in the range of 4.0 to 6.0.

* * * * *